United States Patent [19]

Robinson

[11] 4,321,240

[45] Mar. 23, 1982

[54] TREATMENT OF GASEOUS EFFLUENT

[75] Inventor: Eric Robinson, Lisburn, Northern Ireland

[73] Assignee: Carus Chemical Company, LaSalle, Ill.

[21] Appl. No.: 29,022

[22] Filed: Apr. 11, 1979

Related U.S. Application Data

[63] Continuation-in-part of Ser. No. 785,549, Apr. 7, 1977, abandoned.

[30] Foreign Application Priority Data

Sep. 8, 1976 [GB] United Kingdom ............... 37111/76

[51] Int. Cl.³ .............................................. B01D 53/36
[52] U.S. Cl. .................................... 423/210; 423/245; 423/247; 422/142; 422/144; 422/145; 422/169; 422/178
[58] Field of Search ........................ 423/210, 247, 245; 55/74; 422/142, 144, 145, 169, 178

[56] References Cited

U.S. PATENT DOCUMENTS

| | | | |
|---|---|---|---|
| 2,419,099 | 12/1949 | Fisher | 422/145 X |
| 3,026,186 | 3/1962 | Coty | 422/145 |
| 3,159,450 | 12/1964 | Asher et al. | 423/247 X |
| 3,395,972 | 8/1968 | Hardison | 423/210 |
| 3,455,089 | 7/1969 | Mattia | 55/74 X |
| 3,658,724 | 4/1972 | Stiles | 252/477 X |
| 3,778,387 | 12/1973 | Urbanic et al. | 423/245 |
| 4,025,605 | 5/1977 | Dalton et al. | 423/210 S |

FOREIGN PATENT DOCUMENTS 1436700  5/1976  United Kingdom ............ 423/210 S Primary Examiner—Earl C. Thomas

[57] ABSTRACT

Disclosed is a process for treating a pollutant-containing gaseous effluent of the kind in which the pollutant is susceptible to catalytic oxidation to render it inoffensive, characterized by the steps of passing a major fraction of the effluent through material which will adsorb substantially all of the pollutant therein, while utilizing the remainder of the effluent to transfer, for catalytic oxidation in a catalytic reactor at an elevated temperature, pollutant which has already adsorbed on such material from said major fraction, and to promote the circulation of gases through the catalytic reaction zone, and repeatedly and appropriately changing the role of material from an adsorbing role to a catalytic oxidation role and back again. The process may involve two beds of material which are used alternately as adsorbing beds, the other bed meanwhile being stripped of adsorbed pollutant for catalysis. In another process a single bed of material, which is also an oxidation catalyst for pollutant, is used, and material, with adsorbed pollutant, is continuously circulated from the bed which is preferably fluidized, by entrainment in the remainder of the effluent for conveyance to the catalytic reaction zone, and back again to the bed. Also disclosed is apparatus for carrying out such processes.

4 Claims, 2 Drawing Figures

TREATMENT OF GASEOUS EFFLUENT

RELATED APPLICATION

This application is a continuation-in-part of my copending application Ser. No. 785,549, filed Apr. 7, 1977, now abandoned.

BACKGROUND AND SUMMARY

This invention concerns the treatment of gaseous effluent containing polluting matter which is susceptible to catalytic oxidation to render it inoffensive.

Many industrial processes produce odorous or toxic gases or vapors which if discharged to the atmosphere constitute either a hazard to health or a public nuisance. One solution to this problem is to collect such gases or vapors in mixture with air as they are emitted from the process and to pass the mixture through a heated reactor containing an oxidation catalyst wherein the toxic or odorous compounds are oxidized to harmless or odorless compounds such as carbon dioxide and water.

An alternative process is to pass the mixture through a burner, but direct flame incineration requires that the large volumes of gas involved are heated to high temperatures in order to combust the contaminant. Hence, considerable savings can be made in fuel costs by using catalytic combustion since catalytic reactors effect a considerable reduction in the concentration of pollutants at 150°–500° C. while direct flame incineration requires temperatures above this range.

However, heating large quantities of air to the temperature required for catalytic oxidation can still be costly if, as is frequently the case, the concentration of the contaminant is low and the heat released by its oxidation not contributing significantly to the overall energy requirement.

Another difficulty often encountered is that while catalytic systems can effectively remove 90%–99% of the inlet concentration of gaseous pollutant at such low temperature, in order to obtain complete removal, which, in the case of some odors particularly, is essential, often involves raising the temperature to a level at which the economic advantage of such a system no longer applies.

The object of the present invention is to provide improved and more economic processes for the destructive oxidation of air pollutants.

According to the present invention, a process for treating a pollutant-containing gaseous effluent of the kind in which the pollutant is susceptible to catalytic oxidation, to render it inoffensive, is characterised by the steps of directing a major fraction of the effluent into contact with a high surface area metal oxide capable of adsorbing substantially all of the pollutant, while simultaneously directing a minor fraction into contact with another quantity of the same metal oxide in a second treatment zone maintained at a temperature above 50° C. to strip pollutant from the metal oxide in that second zone and to catalytically oxidise the pollutant, and repeatedly interchanging the role of the metal oxide from one treatment zone to the other to regenerate the adsorbency of the metal oxide containing pollutant in the second treatment zone for repeated use in the first zone. The treatment material used in both zones is a metal oxide, particularly an oxide of chromium, manganese, iron, cobalt, nickel, copper, palladium, silver, or platinum, or mixtures thereof, or oxides or mixtures thereof supported on inorganic supports such as silica gel, alumina, zeolites, capable of catalysing the oxidation of the pollutant at temperatures above 50° C. and capable of adsorbing the pollutant at temperatures substantially below 100° C.

The treatment material may be capable of catalysing the oxidation of pollutant at temperatures above 50° C. for example at temperatures above 150° C. The material may also be capable of adsorbing pollutant at temperatures above 50° C. for example at a temperature between 50° C. and 100° C. The material may be, for example, in the form of porous granules or held together by a binder such as bentonite to form porous pellets. If a support is used it may, if conditions are appropriate, be in the form of a porous ceramic honeycomb or monolith.

In one embodiment of the invention the major fraction passes in a relatively cool state directly to and through a first treatment zone in which there is a first bed of such material capable of adsorbing pollutant from the gaseous effluent, whilst the remainder passes through a second treatment zone in which a second bed of such material with pollutant already adsorbed thereon is heated to a temperature high enough to cause desorption and partial oxidation of the adsorbed pollutant, while in a third bed, also contained within the second treatment zone complete oxidation of the adsorbed pollutant as well as the pollutant carried by the minor fraction occurs, the roles of the first and second beds of material being interchanged at intervals.

In another embodiment of the invention, the major fraction passes in a relatively cool state directly to and through a first treatment zone in which a bed of such material adsorbs pollutant therefrom, whilst the remainder, the minor fraction, passes through a second treatment zone and back to the bed. The minor fraction circulates material with pollutant adsorbed thereon from the bed through the second treatment zone, where the pollutant is catalytically oxidised, and then returns the regenerated material to the bed. The bed of material is preferably fluidised to facilitate a continuous overspill therefrom for entrainment by the minor fraction of said effluent as it passes to the second treatment zone, and eventually for continuous return to the bed.

Also according to the present invention, apparatus for treating a pollutant containing effluent of the kind in which the pollutant is susceptible to catalytic oxidation to render it inoffensive, is characterised by means defining a first treatment zone containing a high surface area metal oxide capable of catalysing the oxidation of such pollutant at temperatures above 50° C. and of adsorbing pollutant at temperatures substantially below 100° C., means defining a second treatment zone, conduit means for directing a major fraction of the pollutant-containing effluent through the first zone and for directing a minor fraction thereof through said second zone, means for maintaining the temperature above 50° C. in the second zone and substantially below 100° C. in the first zone, and means for interchanging the role of the metal oxide from one treatment zone to the other to regenerate the adsorbency of such metal oxide in the second zone for re-use of that oxide in the first zone.

One embodiment of such apparatus comprises a heater, two containers, each accommodating a bed of said material, a catalytic reactor, ducting for connecting a source of effluent to said heater and to each of the containers, means associated selectively with one or other of the containers for catalytic oxidation of pollutant adsorbed by the material supported in that container, and means adapted selectively either to cause a major fraction of effluent flowing from said source to be passed to and through one said bed for discharge therefrom and the remainder successively to and through the heater and the other bed and catalytic reactor for discharge therefrom, or to cause a major fraction of said effluent to be passed to and through the other said bed for discharge therefrom and the remainder successively to and through the heater, the one said bed and the catalytic reactor for discharge therefrom following catalytic oxidation.

Another embodiment of such apparatus comprises a container for a bed of said material in particulate form, means for facilitating the admission of effluent to said container so as to fluidize the bed, a catalytic reactor, means connecting the upper part of said bed to the reactor whereby overspill from the upper part of the bed when fluidized may be continuously directed to said reactor, means connecting said reactor to the lower part of said bed whereby overspill after passing through said reactor is continuously directed to the lower part of said bed, means for introducing a major fraction of an effluent to said container, means for causing the remainder thereof to continuously entrain said overspill and carry it at an elevated temperature to said reactor, and means for discharging effluent which emerges from said bed from said container.

DRAWINGS

DESCRIPTION

Figure 1:
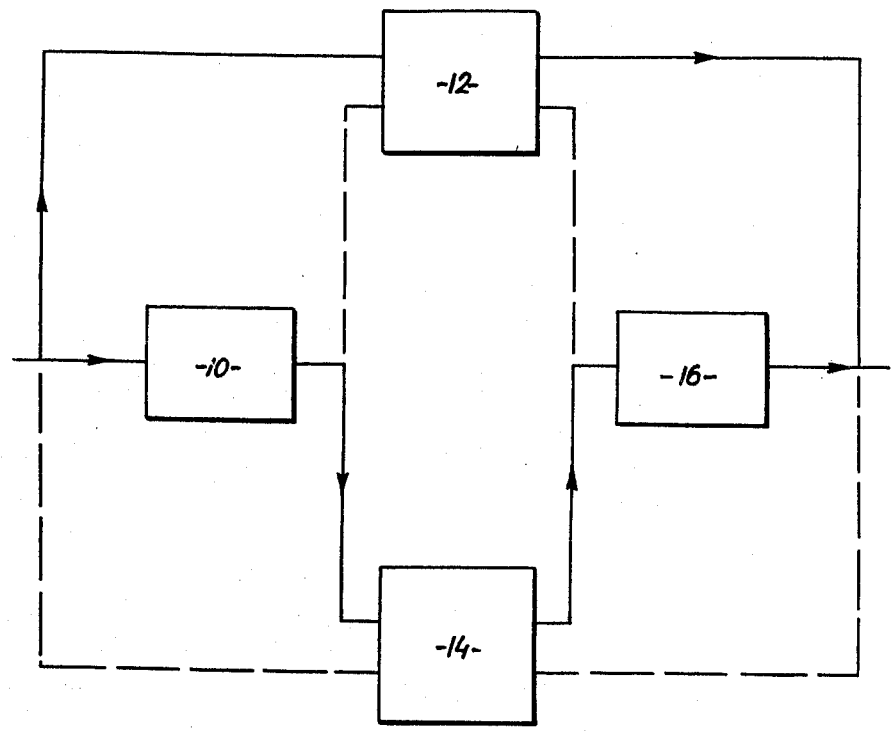
FIG. 1 is a diagram of a form of apparatus which can be used in carrying out one embodiment of the process of the present invention.

Referring first to FIG. 1, the apparatus consists of a heater 10, two adsorption beds 12, 14, one catalytic reactor 16, and associated ducting and appropriate valves, which latter may be automatically controlled.

The adsorbent of the beds 12, 14, is a finely-divided metal oxide capable of catalyzing the oxidation of gaseous pollutants at temperatures above 50° C., and usually no greater than 500° C., and of adsorbing such pollutants at temperatures substantially below 100° C. The adsorbing oxidation catalyst may be any one or combination of oxides of chromium, manganese, iron, cobalt, nickel, copper, palladium, silver, or platinum, all known in the art to have pollutant-adsorbent properties at relatively low temperatures and capable of functioning as oxidation catalysts at higher temperatures. A metal oxide material having the properties of an adsorbent as well as an oxidation catalyst is described in United Kingdom Patent Specification No. 1436700, but other materials having similar properties may be used. By using an adsorbing oxidation catalyst, any polluting matter, whether desorbed or not in the second treatment zone hereinafter described, is oxidized.

In operation, the flow of gaseous effluent is indicated by the arrowed lines. In the first stage the flow is indicated by full lines, a major, unheated, fraction passing through the bed 12 and a minor, heated, fraction passing through the heater 10, bed 14, and reactor 16. In the illustration given, bed 12 is located in what may be regarded as a first treatment zone; that is, a zone in which the bed and the main effluent fraction contacting that bed are maintained at a relatively low temperature substantially under 100° C., and preferably under 50° C., and the pollutant in that fraction is adsorbed by the finely-divided metal oxide which forms the bed. That bed would be supported in a suitable container or casing to which the main fraction is directed for adsorption to occur.

The second treatment zone includes not only bed 14 but also heater 19 and catalytic reactor 16. Since bed 14 is disposed within a container or housing, and since that bed is composed of a metal oxide capable of functioning as an oxidation catalyst at temperatures above 50° C., it is believed apparent that bed 14 functions in at least partially catalytically oxidising pollutant in the heated minor fraction of effluent directed through the housing of bed 14 as well as pollutant previously adsorbed by the finely-divided material within the bed. Catalytic reactor 16 provides catalytic oxidation of pollutant in the discharge from bed 14. Where substantially complete oxidation is achieved by the primary reactor 14, secondary reactor 16 may be omitted.

Similarly, while heater 10 is shown upstream of reactor bed 14, the two might be combined at a single location with the heater being arranged to heat the bed and its container to a temperature at which adsorbed and gaseous pollutants are desorbed and at least partially oxidised.

When the bed 12 has reached the required level of saturation or when the bed 14 has been stripped to the required level, the flow is changed to that shown in dash lines, so that bed 12 is stripped and bed 14 adsorbs pollutant from the effluent and the catalytic reactor 16 receives the discharge from bed 12. In an alternative arrangement the beds may be moved from one flow line to the other. This may be conveniently accomplished by mounting the adsorbent in a cylinder divided into compartments by at least one insulated wall mounted along the axis of the cylinder. The major fraction of contaminated air passes through one compartment for adsorption while heated air passes through a second compartment for stripping. The function of the two compartments is reversed by rotating the cylinder.

Figure 2:
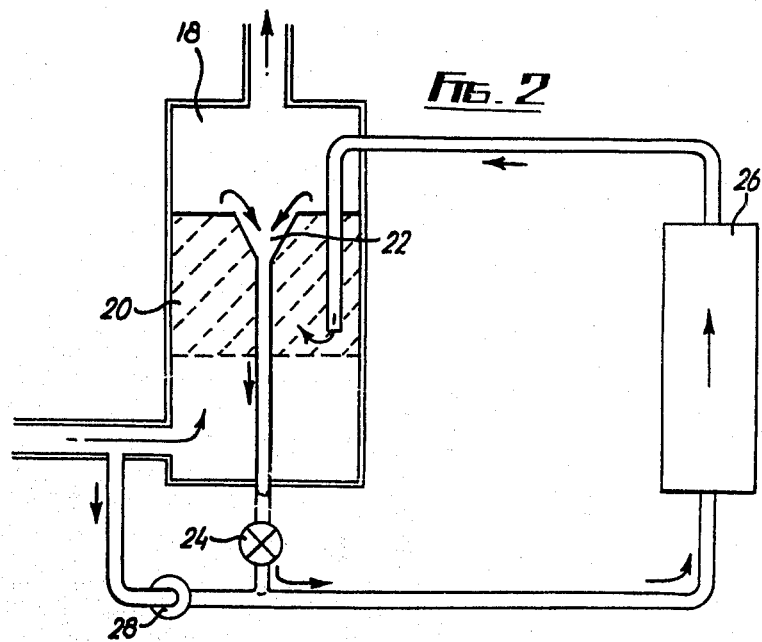
FIG. 2 is a diagram of a form of apparatus which can be used in carrying out a second embodiment of the process of the present invention.

Reference is now made to the apparatus of FIG. 2. Polluted air entering an adsorption chamber 18 fluidizes a bed of adsorbing particulate catalyst 20, the catalyst being of the composition already described, in such a way that some of it is continually falling into a receiver 22 and passing via a non-return trap 24 to an oxidation chamber 26. It is propelled through the oxidation chamber 26 by a small amount of polluted air bled from the main inlet, through a pump 28 if necessary, and heated there to a temperature sufficient to cause oxidation of the adsorbed pollutant, after which is returns to the base of the catalyst bed 20 in the adsorption chamber 18. The temperature of the catalyst material should fall to ambient, or at least to a temperature under 50° C., before returning to the adsorption bed. If necessary, a heat exchanger can be incorporated between the oxidation chamber 26 and the adsorption chamber 18 to insure rapid cooling of catalyst leaving the latter.

In the embodiment of FIG. 2, the first treatment zone (the zone in which adsorption of pollutant takes place) is defined by chamber 18, whereas the second treatment zone (in which catalytic oxidation occurs) is defined by chamber 26. In both embodiments there is an interchange of adsorption catalyst from one treatment zone to the other for the purpose of regenerating the adsorbency of the metal oxide. Thus while in the first embodiment such interchange occurs at timed intervals, in the second embodiment such interchange occurs continuously.

In the operation of the embodiment depicted in FIG. 1, the time taken to saturate a particular adsorbent bed to the required level may be determined by experiment and a timing device used to operate the process automatically. Alternatively, a detector may be used to determine the required saturation point of one adsorbent bed and to automatically switch the gas stream to the other bed. Similarly, in the operation of the embodiment of FIG. 2, the amount of particulate adsorbent circulating through the second treatment zone may be controlled by suitably diminishing the flow passages, by adjusting the proportions of the major and minor fractions, by varying gas flow rates, or in any other suitable manner.

The invention will be described further by way of the following specific examples of how the processes hereinbefore more generally described may be practiced.

EXAMPLE 1

The effectiveness of the process according to the present invention was tested using a manganese catalyst prepared according to Example 4 of our United Kingdom Patent Specification No. 1436700 as both adsorbent and oxidation catalyst in the apparatus shown in FIG. 1. The catalyst was mixed with bentonite in the ratio 10:6 and formed into pellets, ⅛" dia, 3/16" long.

The odor to be removed was that associated with the animal rendering process which could be duplicated in the laboratory by passing air through a heated container holding some crude tallow taken from a meal press. The odor intensity was measured using the Syringe Dilution Method (ASTM Standards, Part 10, D1391-57).

Each bed contained 20 cc of catalyst and the contaminated air with an odor intensity of 100 odor units/ft$^3$ was allowed to enter the adsorption bed at the rate of 4 liters/min. After 2 hours the inlet was switched to the second adsorption bed while the first was stripped with an air flow of 0.1 liters/min at 190° C. for 10 minutes. The temperature of the catalytic reactor was held at 220° C. The outlet air was odorless. The process was repeated 8 times and on each occasion both the stripping temperature and the catalytic reactor temperature were reduced gradually until on the ninth cycle when the stripping temperature had been reduced to 98° C. and the catalytic reactor temperature to 185° C. only 97% of the odor was removed. On returning the stripping temperature to 100° C. and the catalytic reactor temperature to 190° C. an odorless outlet was again obtained.

EXAMPLE 2

Using the same catalyst and apparatus as Example 1 the odor intensity of the inlet was increased to 1500 odor units/ft$^3$ and the inlet flow to 8.4 liters/min. After 140 minutes the inlet was switched to the second column while the first was stripped at 100° C. at a flow of 0.1 liters/min for 15 minutes. The catalytic reactor was held at 198° C. The outlet was odorless. The process was repeated for 8 cycles after which the catalytic reactor temperature was reduced to 180° C. Only 98% of the odor was removed. On returning the reactor temperature at 198° C. complete removal was restored.

EXAMPLE 3

Using the same apparatus and catalyst as for Example 2 the odor intensity of the inlet was increased to 14000 odor units/ft$^3$ at an inlet flow of 4.0 liters/min. The adsorption/stripping/catalytic oxidation cycle was carried out 8 times with a stripping temperature of 97° C., stripping flow of 0.1 liters/min and catalyst temperature of 190° C., the outlet being odorless. When the catalyst temperature was then lowered to 187° C. only 99% removal of odor was observed. On restoring the original catalyst temperature, complete odor removal was observed.

EXAMPLE 4

Using the same apparatus and catalyst, an air stream containing 100 mg/m$^3$ butyric acid flowing at 16 liters/min was admitted to the adsorption bed for 20 minutes. This bed was then stripped at 220° C. for 10 minutes with 0.1 liters/min flow. With the catalyst bed temperature 290° C. a 97% removal of the butyric acid was obtained throughout the cycle.

EXAMPLE 5

Using the same apparatus but with 19 cc of catalyst in each bed an air stream containing methyl ethyl ketone with an odor intensity of 100 odor units/ft$^3$ at 3.4 liters per minute was admitted to the adsorption bed. After 30 minutes the bed was stripped by passing air at 320° C. and 100 mls/min through the bed. The catalyst bed temperature was also maintained at this temperature to obtain complete removal of odor.

EXAMPLE 6

20 cc of catalyst similar to that employed in Example 1 were placed in the adsorption chamber 18 of the apparatus described with reference to FIG. 2. With an air inlet rate of 7 liters/min fluidizing the bed of catalyst 1 cc of catalyst per minute fell into the receiver 22 and passed to the oxidation chamber 26 (or catalytic reactor). When methyl ethyl ketone was added to the inlet air stream to the extent that its concentration was 0.1% v/v in the air and the temperature of the oxidation chamber was set at 350° C. the outlet air remained free of methyl ethyl ketone over a period of 3 hours operation.

EXAMPLE 7

Air containing butyric acid (100 mg/cu meter) was fed at 40 liters/hour to apparatus similar to that shown in FIG. 3. The catalytic reactor 30 contained 20 cc catalyst similar to that employed in Example 1. The catalytic reactor was held at a temperature of 250° C. The adsorption beds 38 contained 10 cc each of the same catalyst used as adsorbent. The temperature of the air stream was cooled to 40° C. before entering the adsorption bed. During stripping the adsorption bed temperature reached 160° C. Using an adsorption period of one hour on each bed the overall removal of butyric acid over 6 cycles was 99%.

I claim:

1. A process for treating a gaseous effluent containing a pollutant susceptible to catalytic oxidation with particles of a metal oxide capable of adsorbing said pollutant at an adsorbing temperature substantially below 100° C. and of oxidizing said pollutant at an oxidizing temperature substantially higher than said adsorbing temperature, comprising the steps of fluidizing a bed of said metal oxide particles with an upward flow of said pollutant-containing gaseous effluent at an adsorbing temperature substantially below 100° C. to cause adsorption of pollutant on said particles as they circulate within said bed and to remove pollutant from said effluent, continuously diverting a fractional portion of the particles with pollutant adsorbed thereon from said fluidized bed and conveying the same by a gaseous carrier stream from said bed and through a catalytic oxidation zone maintained at an oxidizing temperature substantially higher than said adsorbing temperature to strip pollutant from said particles and to oxidize the pollutant so removed, and thereafter cooling the diverted particles and carrier stream and directing the same back into said fluidized bed.

2. The process of claim 1 in which there is the preliminary step of dividing the flowing gaseous pollutant-containing effluent into major and minor fractions upstream of said bed, said major fraction being the pollutant-containing effluent introduced into said bed to fluidize the same, and said minor fraction forming said gaseous carrier stream.

3. The process of claim 1 or 2 in which said diverting step comprises removing particles with pollutant adsorbed thereon from the upper portion of said bed.

4. The process of claim 1 or 2 in which said step of directing said carrier stream and particles back into said bed comprises introducing the same into the lower portion of said bed.

* * * * *

UNITED STATES PATENT OFFICE
CERTIFICATE OF CORRECTION

Patent No. 4,321,240          Dated March 23, 1982

Inventor(s) Eric Robinson

It is certified that error appears in the above-identified patent and that said Letters Patent are hereby corrected as shown below:

On cover page after "Assignee", delete "Carus Chemical Company, LaSalle, Ill.", and insert - Lambeg Industrial Research Association, Lisburn, Northern Ireland-.

Signed and Sealed this

Twentieth Day of July 1982

[SEAL]

Attest:

GERALD J. MOSSINGHOFF

Attesting Officer     Commissioner of Patents and Trademarks